(12) United States Patent
Nava Gonzalez (10) Patent No.: US 10,591,055 B2
(45) Date of Patent: Mar. 17, 2020

(54) ACTUATOR WITH AUXILIARY MOTOR

(71) Applicants: Robert Bosch LLC, Broadview, IL (US); Robert Bosch GmbH, Stuttgart (DE)

(72) Inventor: Raul Nava Gonzalez, Toluca (MX)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 534 days.

(21) Appl. No.: 15/401,676

(22) Filed: Jan. 9, 2017

(65) Prior Publication Data
US 2018/0195603 A1   Jul. 12, 2018

(51) Int. Cl.
| | | |
|---|---|---|
| *F16H 61/32* | (2006.01) | |
| *F16H 1/22* | (2006.01) | |
| *F16H 63/28* | (2006.01) | |
| *F16H 63/34* | (2006.01) | |
| *F16H 61/12* | (2010.01) | |
| *F16D 1/06* | (2006.01) | |
| *F16D 1/10* | (2006.01) | |
| *F16H 61/28* | (2006.01) | |
| *F16H 63/18* | (2006.01) | |

(52) U.S. Cl.
CPC .............. *F16H 61/32* (2013.01); *F16D 1/06* (2013.01); *F16D 1/101* (2013.01); *F16H 1/222* (2013.01); *F16H 63/28* (2013.01); *F16H 63/3466* (2013.01); *F16H 63/3491* (2013.01); *F16D 2001/102* (2013.01); *F16H 63/18* (2013.01); *F16H 2061/1232* (2013.01); *F16H 2061/1288* (2013.01); *F16H 2061/1292* (2013.01); *F16H 2061/2892* (2013.01); *F16H 2061/326* (2013.01)

(58) Field of Classification Search
CPC .......... F16H 61/32; F16H 1/222; F16H 63/28; F16H 63/3466; F16H 2061/1232
USPC .......................................................... 74/661
See application file for complete search history.

(56) References Cited

U.S. PATENT DOCUMENTS

| | | | |
|---|---|---|---|
| 1,866,614 A | 4/1924 | Albert | |
| 4,463,628 A * | 8/1984 | Ahlschwede | F16H 59/02 |
| | | | 192/3.57 |
| 5,996,719 A | 12/1999 | Galli | |
| 6,688,448 B2 | 2/2004 | Giefer et al. | |
| 8,281,681 B2 | 10/2012 | Kimura et al. | |
| 9,470,277 B2 * | 10/2016 | Dow | G05G 1/04 |
| 10,234,028 B2 * | 3/2019 | Jeon | F16H 61/28 |

(Continued)

FOREIGN PATENT DOCUMENTS

| | | |
|---|---|---|
| EP | 1314910 | 5/2003 |
| WO | 2013173474 | 11/2013 |

*Primary Examiner* — Ha Dinh Ho
(74) *Attorney, Agent, or Firm* — Kelly McGashen; Maginot, Moore & Beck LLP (57) ABSTRACT

An electronic transmission range select actuator (ETRSA) includes two independent drive systems that are each able to actuate a common shaft, for example an output shaft of the ETRSA, via a coupling device disposed between and connecting the gear trains of each system. The first drive system of the two independent drive systems is used during normal vehicle operation to change the transmission gear range to a desired gear range. The second drive system is used in case of abnormal operation of the first drive system to return the vehicle transmission to the park transmission range.

18 Claims, 5 Drawing Sheets

(56) References Cited

U.S. PATENT DOCUMENTS

2011/0126657 A1\* 6/2011 Ganter ................... F16H 61/12
74/473.12

\* cited by examiner

ACTUATOR WITH AUXILIARY MOTOR

BACKGROUND

In some vehicles, gear position or range within the power train is shifted via a shift-by-wire or electronic transmission range selector. This device includes an actuator that is controlled via a wired connection by a remote range selector operated by the vehicle user. Using the electronic transmission range selector, the vehicle user is able to change the transmission gear range between the several available gear ranges, including park, neutral, drive, reverse, etc. An electronic transmission range selector is advantageous compared to some conventional vehicle transmission range selectors that are controlled via a gear shift lever that is connected to the transmission via a mechanical linkage. For example, the electronic transmission range selector has a reduced space requirement within the vehicle compartment as compared to the conventional mechanical transmission range selector.

The actuator of the electronic transmission range selector may be an electric motor. In this case, it is important to be able to securely place the vehicle in the park transmission range in the event of an abnormality and/or failure occurs in the actuator power source (i.e., a vehicle battery), the electrical conductors that supply power to the actuator, or in the actuator itself.

SUMMARY

In some aspects, a transmission system includes an output shaft, a first gear train and a second gear train. The first gear train connects a first actuator to the output shaft and transmits rotational output of the first actuator to the output shaft, and includes a carrier that is fixed to the output shaft. The second gear train connects a second actuator to the output shaft and transmits rotational output of the second actuator to the output shaft. The second gear train includes a drive ring that surrounds the carrier. In some operating conditions of the transmission system, the output shaft is driven by the first actuator to rotate over a limited rotational range via the first gear train and the drive ring is configured to provide lost motion relative to the carrier over the limited rotational range. In addition, in other operating conditions of the transmission system, the output shaft is driven by the second actuator via the second gear train and the drive ring is configured to engage the carrier to adjust the angular orientation of the output shaft.

The transmission system includes one or more of the following features: The transmission system is configured so that during the some operating conditions of the transmission system, the output shaft is driven by the first gear train and the second gear train is inactive, and during the other operating conditions of the transmission system, the output shaft is driven by solely by the second gear train. The carrier includes a hub that is supported on the output shaft, and a dog tooth that protrudes radially outwardly from the hub. The drive ring includes a pair of diametrically opposed drive teeth that protrude inward from an inner surface of the drive ring, and the drive ring is supported on the hub via the drive teeth. The carrier includes a hub that is supported on the output shaft, and a pair of equidistantly-spaced dog teeth that protrude radially outwardly from the hub, the drive ring includes a pair of diametrically opposed drive teeth that protrude inward from an inner surface of the drive ring, during the some operating conditions of the transmission system, the output shaft is driven by the first gear train whereby the carrier rotates relative to the drive ring within the limited rotational range and does not engage the drive teeth, and during the other operating conditions of the transmission system, the output shaft is driven by the second gear train via engagement of the drive teeth with the dog teeth. A drive shaft of the first actuator is parallel to the output shaft, the first gear train comprises an idler shaft, and gears mounted on the idler shaft transmit rotation from a gear on the drive shaft of the first actuator to a gear on the output shaft such that the rate of rotation of the output shaft is less than the rate of rotation of the drive shaft of the first actuator. A drive shaft of the second actuator is perpendicular to the output shaft and supports a worm gear, and the second gear train includes the worm gear, a ring gear having external teeth that engage teeth of the worm gear, and the drive ring, where the drive ring is fixed to an inner surface of the ring gear. A transmission range of the transmission system is set based on an angle of the output shaft, the first gear train is operable to rotate the output shaft between a first angle corresponding to a parking transmission range and at least one other angle, the at least one other angle corresponding to a non-parking transmission range, and the second gear train is operable to rotate the output shaft from the at least one other angle to the first angle. The second gear train remains idle when the first the first gear train is operating.

In some aspects, an electronic transmission range select actuator (ETRSA) for setting a transmission range of a vehicle includes an output shaft, a first gear train and a second gear train. The output shaft is configured to be connected to a transmission of the vehicle. The first gear train connects a first actuator to the output shaft and transmits rotational output of the first actuator to the output shaft. The first gear train includes a carrier that is fixed to the output shaft. The second gear train connects a second actuator to the output shaft and transmits rotational output of the second actuator to the output shaft. The second gear train includes a drive ring that surrounds the carrier. In some operating conditions of the transmission system, the output shaft is driven by the first actuator to rotate over a limited rotational range via the first gear train and the drive ring is configured to provide lost motion relative to the carrier over the limited rotational range. In addition, in other operating conditions of the transmission system, the output shaft is driven by the second actuator via the second gear train and the drive ring is configured to engage the carrier to adjust the angular orientation of the output shaft.

The ETRSA may include one or more of the following features: The ETRSA is configured so that during the some operating conditions of the electronic transmission range select actuator, the output shaft is driven by the first gear train and the second gear train is inactive, and during the other operating conditions of the electronic transmission range select actuator, the output shaft is driven by solely by the second gear train. The carrier comprises a hub that is supported on the output shaft, and a dog tooth that protrudes radially outwardly from the hub. The drive ring comprises a pair of diametrically opposed drive teeth that protrude inward from an inner surface of the drive ring, and the drive ring is supported on the hub via the drive teeth. The carrier comprises a hub that is supported on the output shaft, and a pair of equidistantly-spaced dog teeth that protrude radially outwardly from the hub, the drive ring comprises a pair of diametrically opposed drive teeth that protrude inward from an inner surface of the drive ring, during the some operating conditions of the electronic transmission range select actuator, the output shaft is driven by the first gear train whereby the carrier rotates relative to the drive ring within the limited rotational range and does not engage the drive teeth, and during the other operating conditions of the electronic transmission range select actuator, the output shaft is driven by the second gear train via engagement of the drive teeth with the dog teeth. A drive shaft of the first actuator is parallel to the output shaft, the first gear train comprises an idler shaft, and gears mounted on the idler shaft transmit rotation from a gear on the drive shaft of the first actuator to a gear on the output shaft such that the rate of rotation of the output shaft is less than the rate of rotation of the drive shaft of the first actuator. A drive shaft of the second actuator is perpendicular to the output shaft and supports a worm gear, and the second gear train includes the worm gear, a ring gear having external teeth that engage teeth of the worm gear, and the drive ring, where the drive ring is fixed to an inner surface of the ring gear. A transmission range is set based on an angle of the output shaft, the first gear train is operable to rotate the output shaft between a first angle corresponding to a parking transmission range and at least one other angle, the at least one other angle corresponding to a non-parking transmission range, and the second gear train is operable to rotate the output shaft from the at least one other angle to the first angle. The second gear train remains idle when the first the first gear train is operating.

In some aspects, an ETRSA includes two independent drive systems that are each able to actuate a common shaft, for example an output shaft of the ETRSA, via a coupling device disposed between and connecting the gear trains of each system. The first or primary drive system of the two independent drive systems is intended to be used at all times during normal vehicle operation to change the transmission gear range to a desired gear range. The first drive system includes a first actuator and a first gear train that connects the first actuator to the output shaft via the coupling device. In many embodiments, the first actuator is powered by the vehicle battery. The second or fail-safe drive system of the two independent drive systems is used in case of abnormal operation and/or failure of the first actuator power source (i.e., a vehicle battery), the electrical conductors that supply power to the first actuator, or in the first actuator itself. The second drive system includes a second actuator and a second gear train that connects the second actuator to the output shaft via the coupling device. The second drive system has a different power source than the first drive system so that it remains operable in the event the first actuator power source fails. Advantageously, the secondary system is configured to actuate the output shaft in such a way as to return the vehicle transmission to the park transmission range during failure of the first drive system.

The coupling device includes a drive ring and a carrier mounted concentrically within the drive ring so as to rotate relative to the drive ring. The drive ring is configured so that, during normal operation of the ETRSA, the carrier is permitted to rotate relative to the drive ring over a predetermined rotational range without engagement with the drive ring. During abnormal operation of the ETRSA, for example failure of the first drive system, the drive ring is driven by the second drive system to rotate relative to the carrier and engage with the carrier in such a way as to cause it to rotate. In particular, the second drive system rotates the output shaft via the drive ring and carrier such that the vehicle transmission is placed in the park transmission range.

DETAILED DESCRIPTION

Figure 1:
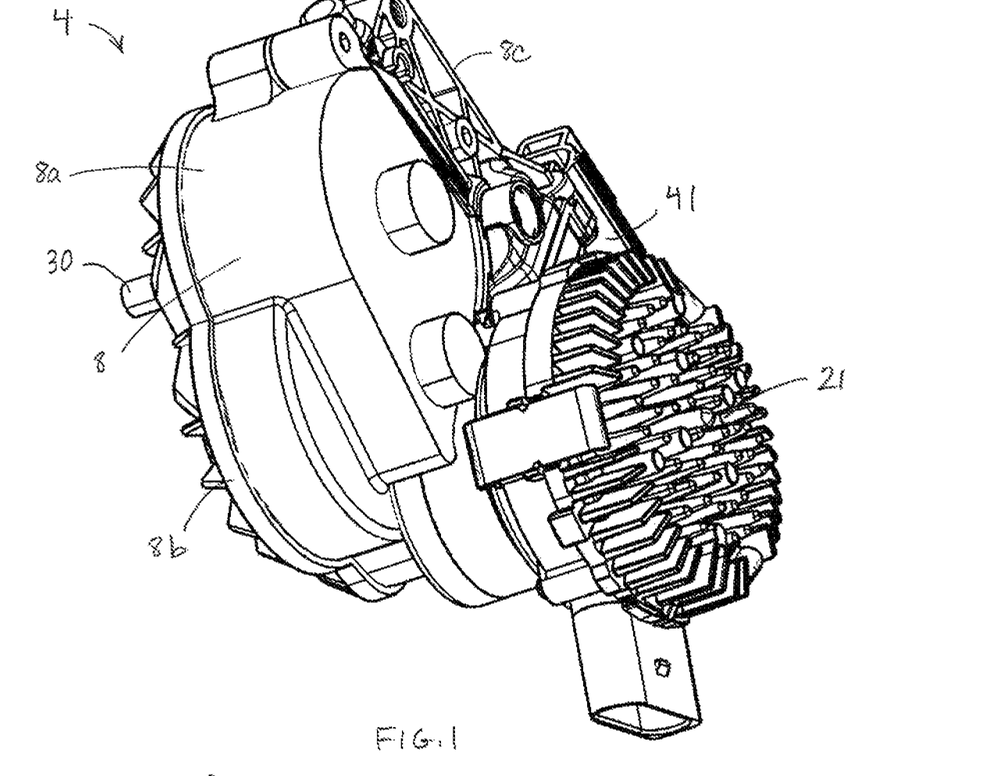
FIG. 1 is a perspective view of an ETRSA.
Figure 2:
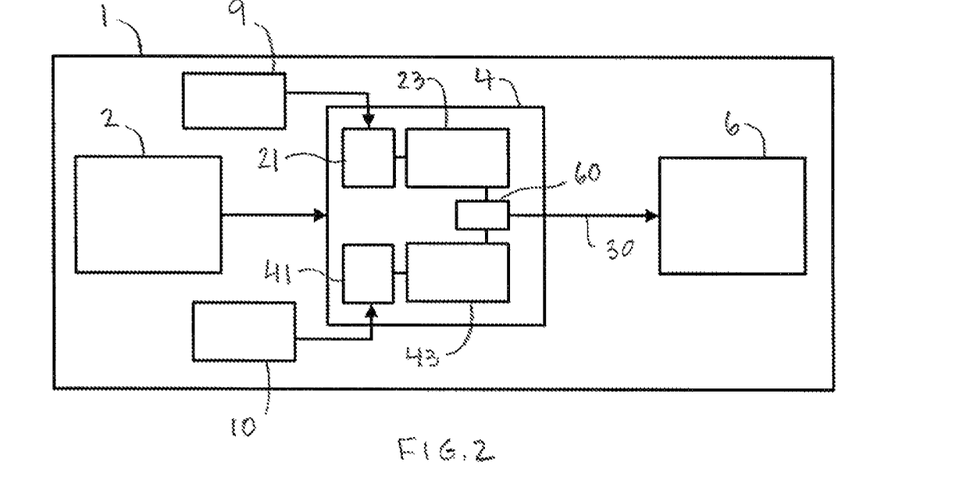
FIG. 2. Is a schematic diagram of a vehicle including an electronic transmission range selector system including the ETRSA of FIG. 1.

Referring to FIGS. 1 and 2, a vehicle 1 includes an electronic transmission range selector 2 for setting a transmission range within the vehicle transmission 6. The transmission range selector 2 is remote from the vehicle transmission 6, and is operated by the vehicle user to select the transmission range. The transmission range selector 2 controls the transmission range via a wired connection to an ETRSA 4 that, in turn, is connected to the transmission 6 via an output shaft 30 of the ETRSA 4. Using the transmission range selector 2, the vehicle user is able to change the transmission gear range between the available gear ranges, including park, neutral, drive, reverse, etc. The ETRSA 4 includes a first drive system 20 disposed that changes the range of the transmission 6 via the output shaft 30 during normal operation of the ETRSA 4. In addition, the ETRSA 4 includes a second drive system 40 that is inactive during normal operation of the ETRSA 4, and changes the range of the transmission 6 via the output shaft 30 during abnormal operation of the ETRSA 4. The first and second drive systems 20, 40 are each connected to the output shaft 30 of the ETRSA 4 via a coupling device 60. The first and second drive systems 20, 40 and the coupling device 60 are disposed within a housing 8 that is an assembly of three housing portions 8a, 8b, 8c. The first and second drive systems 20, 40 and the coupling device 60 are described in detail below.

Figure 3:
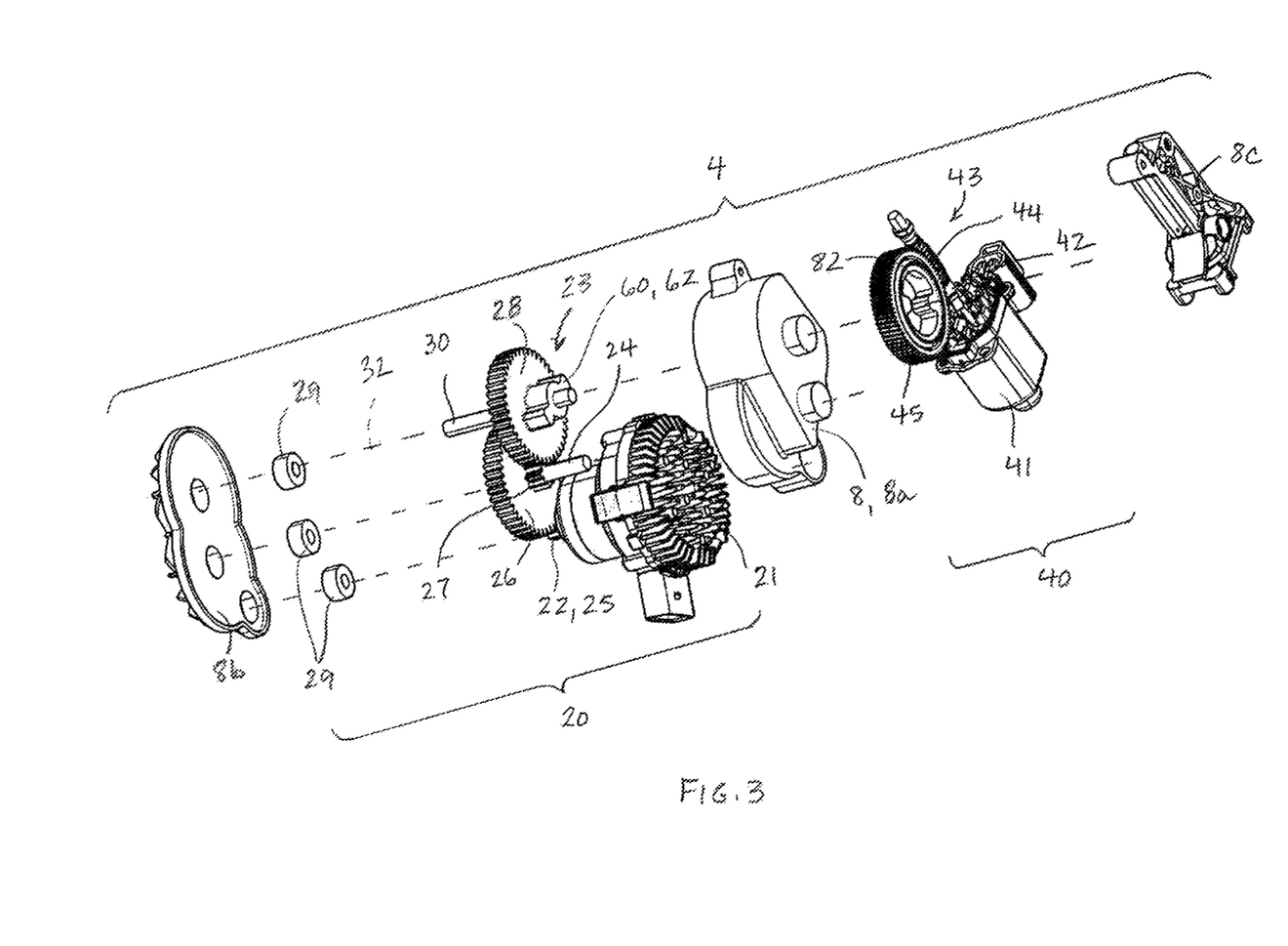
FIG. 3 is an exploded perspective view of the ETRSA.
Figure 4:
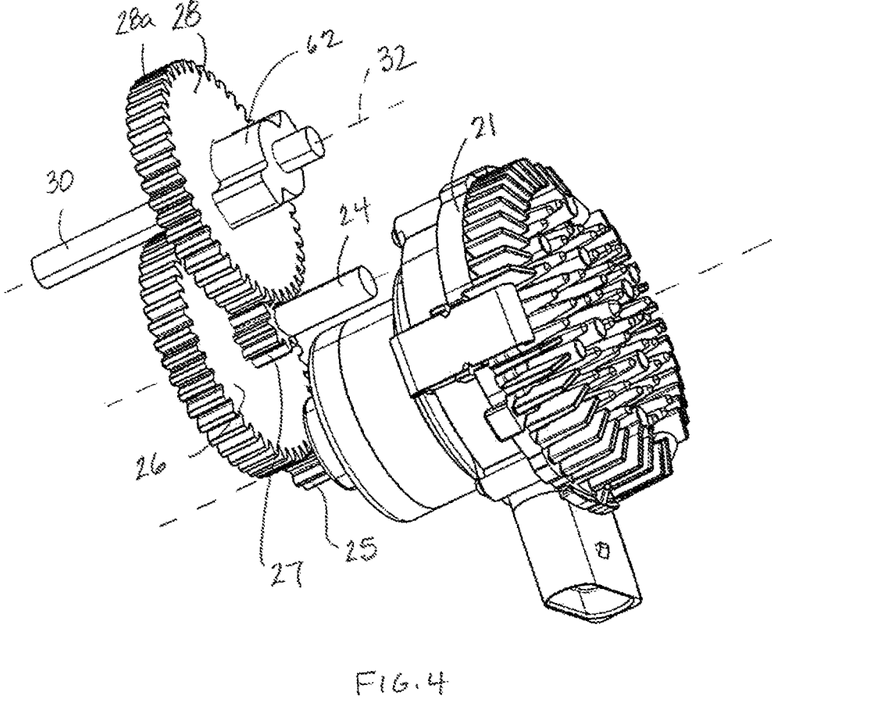
FIG. 4 is a perspective view of the first drive system shown isolated from the ETRSA and with the housing omitted.
Figure 5:
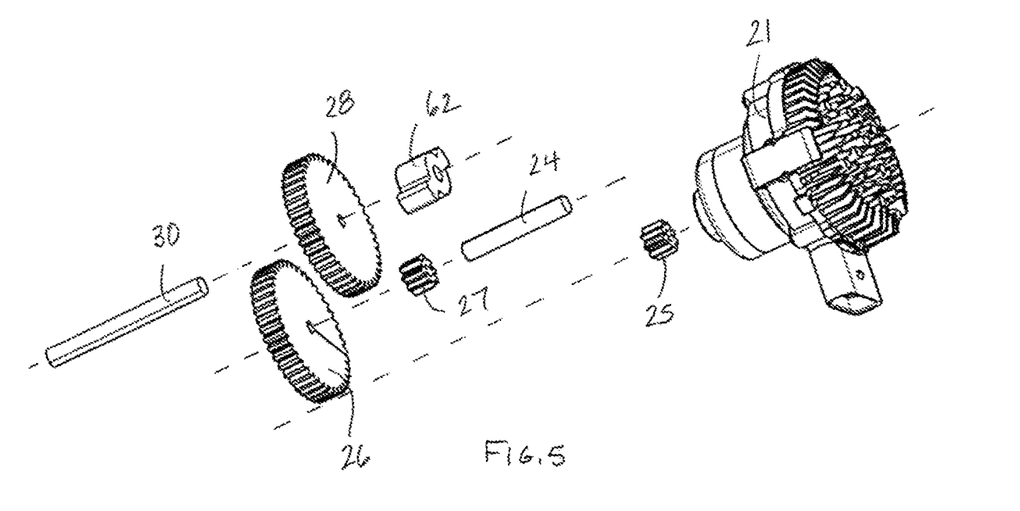
FIG. 5 is an exploded perspective view of the first drive system of FIG. 4.

Referring to FIGS. 3-5, the first drive system 20 includes a first actuator 21 that is connected to the output shaft 30 via a first gear train 23. The first actuator 21 is a brushless, direct current (DC) electric motor that is powered by the vehicle battery 9. The first gear train 23 includes a first gear 25 fixed to the output shaft of the first actuator 21, which is referred to herein as the first drive shaft 22. The first gear 25 has external teeth that engage external teeth of a second gear 26 that is fixed to an idler shaft 24 that is parallel to both the first drive shaft 22 and the output shaft 30. A third gear 27 is fixed on the idler shaft 24 and rotates in concert with the second gear 26. External teeth of the third gear are engaged with external teeth of a fourth gear 28 that is fixed to the output shaft 30. The first gear 25, the second gear 26, the third gear 27 and the fourth gear 28 are spur gears.

The first gear train 23 transmits rotational output of the first drive shaft 22 to the output shaft 30 during normal operation of the ETRSA 4, and is a speed reduction gear train. To this end, the first gear 25 has a small diameter relative to the diameter of the second gear 26. In addition, the third gear 27 has a small diameter relative to the diameter of the fourth gear 28. As a result, the output shaft 30 rotates more slowly than the first drive shaft 22.

The first gear train also includes a carrier 62 of the coupling device 60. The carrier 62 is fixed to the output shaft 30 adjacent to the fourth gear 28, and will be described in detail below.

Figure 6:
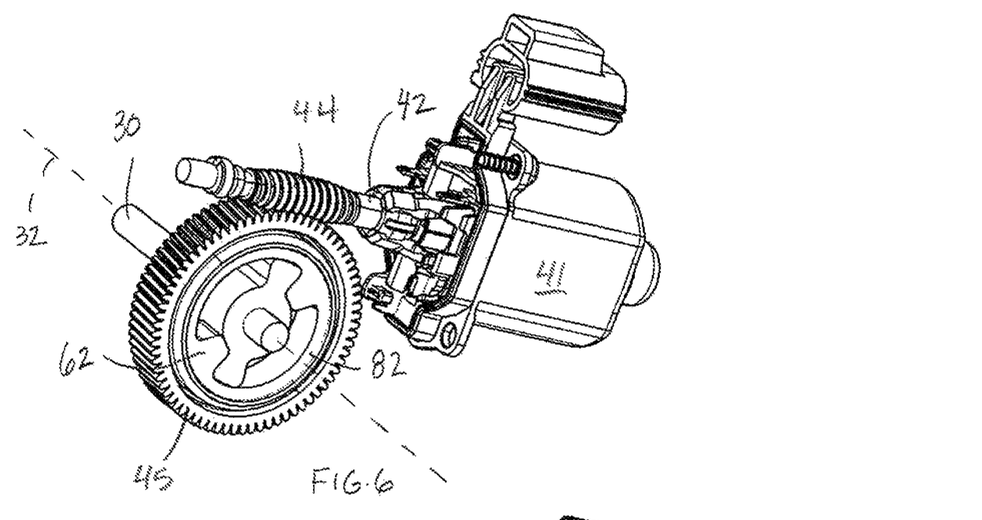
FIG. 6 is a perspective view of the second drive system shown isolated from the ETRSA and with the housing omitted.
Figure 7:
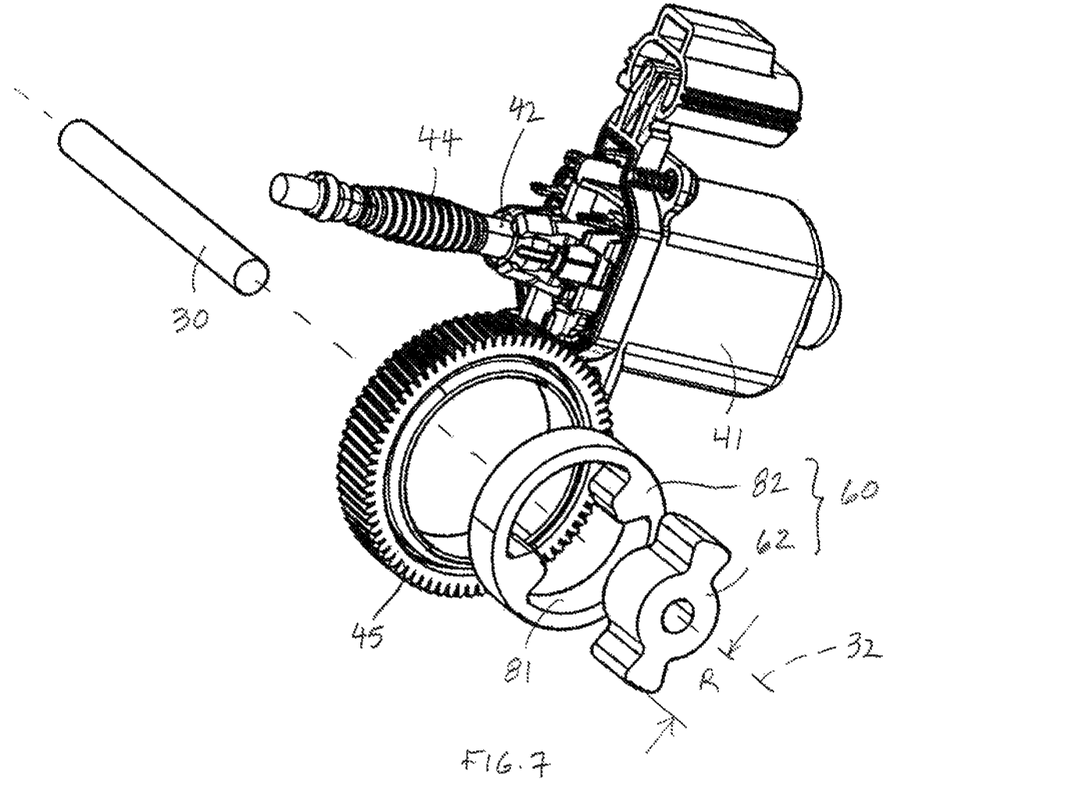
FIG. 7 is an exploded perspective view of the second drive system of FIG. 6.

Referring to FIGS. 3, 6 and 7, the second drive system 40 includes a second actuator 41 that is connected to the output shaft 30 via a second gear train 43. The second actuator 41 is a brushed DC electric motor that is powered by a secondary power source 10 such as a secondary battery or a capacitor. Thus, the power source for the second actuator 41 is different from, and independent of, the power source for the first actuator 21 (e.g., the vehicle battery 9).

The second gear train 43 includes a worm gear 44 fixed to the output shaft of the second actuator 41. The output shaft of the second actuator 41, referred to herein as the second drive shaft 42, is perpendicular to the output shaft 30. The worm gear 44 has angled, threaded external teeth that engage correspondingly threaded external teeth of a ring gear 45. A drive ring 82 of the coupling device 60 is supported on, and fixed relative to, the inner cylindrical surface of the ring gear 45. In addition, the ring gear 45 is supported on the output shaft 30 via the drive ring 82 and the carrier 62, as discussed further below. The second gear train 43 transmits rotational output of the second drive shaft 42 to the output shaft 30. However, the second drive system 40 is only operated during a failure or abnormal operation of the first drive system 20. That is, during normal operation of the first drive system 20, the second drive system 40 is idle.

Figure 8:
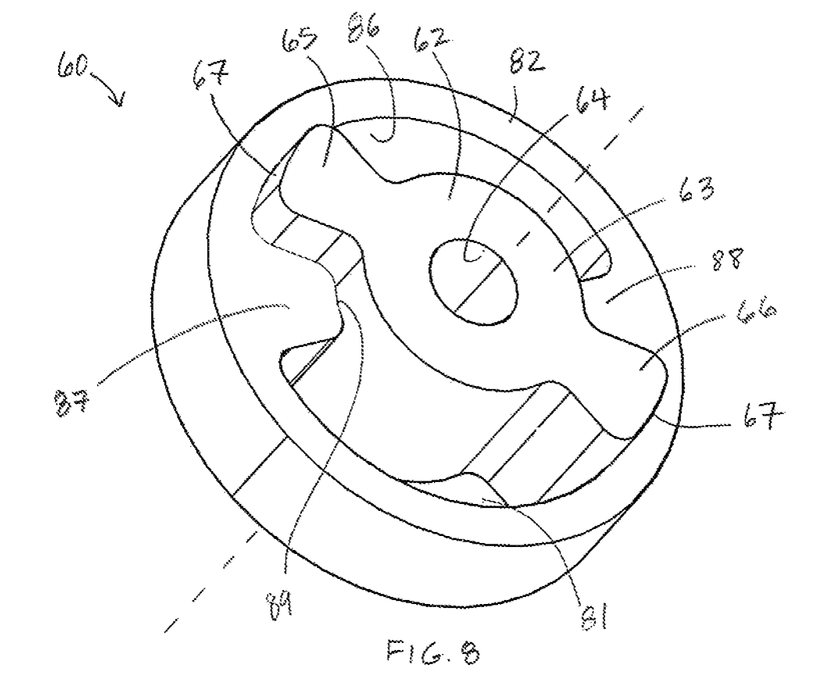
FIG. 8 is a perspective view of the isolated coupling device.
Figure 9:
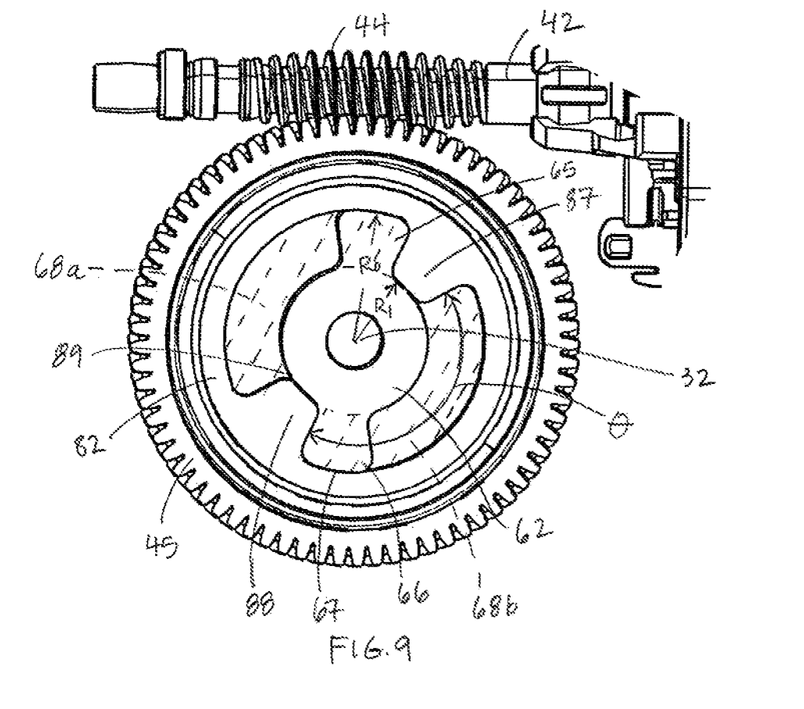
FIG. 9 is side view of the coupling device.

Referring to FIGS. 8 and 9, the first gear train 23 and the second gear train 43 are each connected to the output shaft 30 via the coupling device 60 that includes the carrier 62 and the drive ring 82 that surrounds, and is supported on, the carrier 62.

The carrier 62 includes a hub 63 having a central opening 64. The central opening 64 receives the output shaft 30 therethrough and is fitted to the outer diameter of the output shaft 30. In addition, the carrier 62 includes a pair of dog teeth 65, 66 that protrude outward from the hub 63 in a direction transverse to the rotational axis 32 of the output shaft 30. The dog teeth 65, 66 are equidistantly spaced apart, and thus are disposed on diametrically opposed sides of the hub 63.

When the output shaft 30 rotates, the movement of each dog tooth 65, 66 defines an arc-shaped swept region 68 having an outer radius Ro that corresponds to a distance from the output shaft rotational axis 32 to a distal end 67 of the dog teeth 65, 66, and an inner radius Ri that corresponds to a radius of the hub 63. The rotational range of the output shaft 30 is limited such that the swept region 68 has an arc length corresponding to a predetermined angle θ. In the illustrated embodiment, the predetermined angle θ is 110 degrees.

The drive ring 82 is a short cylindrical element having an outer surface that is fitted within the inner surface of the ring gear 45 such that the drive ring 82 is fixed relative to the ring gear 45. The drive ring 82 includes a central cutout 81. The central cutout 81 has an irregular shape that defines a pair of diametrically opposed drive teeth 87, 88. The drive teeth 87, 88 protrude inward toward the output shaft rotational axis 32 from an inner surface of the drive ring 82. In particular, the drive teeth 87, 88 protrude inward to an extent that distal ends 89 of the drive teeth 87, 88 abut an outer surface of the hub 63. During operation of the second drive system 40, and when the drive ring 82 is rotated by the second actuator via the worm gear 44 and ring gear 45, the outer surface of the hub 63 is a bearing surface for the drive teeth 87, 88.

The drive teeth 87, 88 have a circumferential dimension that is selected correspond to the spacing between the swept region 68a of the first dog tooth 65 and the swept region 68b of the second dog tooth 66. In addition, during normal operation of the ETRSA 4, the drive ring 82 is oriented so that the drive teeth 87, 88 are disposed in the spaces between the two swept regions 68a, 68b.

During normal operation of the ETRSA 4, the first actuator 21 drives the output shaft 30 to rotate within the predetermined angle θ while shifting the transmission 6 between the available gear ranges, including park, neutral, drive, reverse, etc., in accordance with the output of the range selector 2. Since rotational range of the output shaft 30 is limited, the dog teeth 65, 66 of the carrier 62 do not engage with the drive teeth 87, 88 of the drive ring 82 during normal operation. Thus, the drive ring 82 provides lost motion relative to the carrier 62 over a limited rotational range of the output shaft 30 corresponding to the predetermined angle θ.

During abnormal operation of the first drive system 20, the second drive system is used to return the transmission 6 to the park range regardless of the transmission range being used at the time of system abnormality. In particular, the second actuator 41 drives the drive ring 82 via the worm gear 44 and ring gear 45 in such a way that the drive teeth 87, 88 engage the dog teeth 65, 66 by moving into the swept regions 68a, 68b and driving the carrier 62, thereby rotating the output shaft 30. The output shaft 30 is rotated by the second drive system 40 in such a way as to return the transmission 6 from a non-park range to the park range.

In some embodiments, the abnormal operation of the first drive system 20 is detected by a electronic control unit (ECU, not shown). The ECU may be dedicated to the vehicle transmission system or may control operation of several vehicle functions. Upon detection of the abnormal operation of the first drive system 20, the ECU controls the second drive system 40 to return the transmission 6 to the parking range. Since the second drive system 40 is powered independently of the first drive system 20, the ETRSA 4 provides robust and reliable fail-safe actuation of the vehicle transmission 6. Once the abnormality is corrected (for example, in some cases by restoring power to the first drive system), the ECU returns the second drive system 40 to its original position to allow normal operation of the first drive system 20.

In the illustrated embodiment, the first actuator 21 is a brushless DC electric motor that is powered by the vehicle battery 9. It is understood, however, that the first actuator 21 is not limited to being powered by this type of electric motor, and that other types of electric motors or other motive sources can be used to drive the first gear train, and the specific motive source used is determined by the requirements of the specific application. In addition, the first actuator is not limited to being powered by the vehicle battery, and that the vehicle battery may be replaced by another appropriate power source.

In the illustrated embodiment, the second actuator 41 is a brushed DC electric motor that is powered by the secondary power source 10. It is understood, however, that the second actuator 41 is not limited to being powered by this type of electric motor, and that other types of electric motors or other motive sources can be used to drive the second gear train, and the specific motive source used is determined by the requirements of the specific application.

The carrier 62 and the fourth gear 28 are described herein as being separate elements that are each fixed to the output shaft 30. It is understood, however, that in some embodiments, the carrier 62 and the fourth gear 28 can be formed together as a single element that is, in turn, fixed to the output shaft 30. In other embodiments, the carrier 62, the fourth gear 28 and the output shaft 30 may be formed together as a single element.

The ring gear 45 and the drive ring 82 are described herein as being separate elements in which the drive ring 82 is fixed to an inner surface of the ring gear 45. It is understood, however, that in some embodiments, the ring gear 45 and the drive ring 82 can be formed together as a single element.

In the illustrated embodiment, the predetermined angle θ is 110 degrees. It is understood, however, that the predetermined angle θ may be made larger or smaller as required by the requirements of the specific application.

Selective illustrative embodiments of the actuator are described above in some detail. It should be understood that only structures considered necessary for clarifying the actuator have been described herein. Other conventional structures, and those of ancillary and auxiliary components of the actuator, are assumed to be known and understood by those skilled in the art. Moreover, while a working example of actuator have been described above, the actuator is not limited to the working examples described above, but various design alterations may be carried out without departing from the actuator as set forth in the claims.

What is claimed is:

1. A transmission system including
   an output shaft;
   a first gear train that connects a first actuator to the output shaft and transmits rotational output of the first actuator to the output shaft, the first gear train including a carrier that is fixed to the output shaft;
   a second gear train that connects a second actuator to the output shaft and transmits rotational output of the second actuator to the output shaft, the second gear train including a drive ring that surrounds the carrier, wherein
      in some operating conditions of the transmission system, the output shaft is driven by the first actuator to rotate over a limited rotational range via the first gear train and the drive ring is configured to provide lost motion relative to the carrier over the limited rotational range, and
      in other operating conditions of the transmission system, the output shaft is driven by the second actuator via the second gear train and the drive ring is configured to engage the carrier to adjust an angular orientation of the output shaft.

2. The transmission system of claim 1, wherein the transmission system is configured so that during the some operating conditions of the transmission system, the output shaft is driven by the first gear train and the second gear train is inactive, and during the other operating conditions of the transmission system, the output shaft is driven solely by the second gear train.

3. The transmission system of claim 1, wherein the carrier comprises
   a hub that is supported on the output shaft, and
   a dog tooth that protrudes radially outwardly from the hub.

4. The transmission system of claim 3, wherein the drive ring comprises a pair of diametrically opposed drive teeth that protrude inward from an inner surface of the drive ring, and the drive ring is supported on the hub via the drive teeth.

5. The transmission system of claim 1, wherein
   the carrier comprises a hub that is supported on the output shaft, and a pair of equidistantly-spaced dog teeth that protrude radially outwardly from the hub,
   the drive ring comprises a pair of diametrically opposed drive teeth that protrude inward from an inner surface of the drive ring,
   during the some operating conditions of the transmission system, the output shaft is driven by the first gear train whereby the carrier rotates relative to the drive ring within the limited rotational range and does not engage the drive teeth, and
   during the other operating conditions of the transmission system, the output shaft is driven by the second gear train via engagement of the drive teeth with the dog teeth.

6. The transmission system of claim 1, wherein
   a drive shaft of the first actuator is parallel to the output shaft,
   the first gear train comprises an idler shaft, and
   gears mounted on the idler shaft transmit rotation from a gear on the drive shaft of the first actuator to a gear on the output shaft such that the rate of rotation of the output shaft is less than the rate of rotation of the drive shaft of the first actuator.

7. The transmission system of claim 1, wherein
   a drive shaft of the second actuator is perpendicular to the output shaft and supports a worm gear, and
   the second gear train includes
      the worm gear,
      a ring gear having external teeth that engage teeth of the worm gear, and
      the drive ring, where the chive ring is fixed to an inner surface of the ring gear.

8. The transmission system of claim 1, wherein
   a transmission range of the transmission system is set based on an angle of the output shaft,
   the first gear train is operable to rotate the output shaft between a first angle corresponding to a parking transmission range and at least one other angle, the at least one other angle corresponding to a non-parking transmission range, and
   the second gear train is operable to rotate the output shaft from the at least one other angle to the first angle.

9. The transmission system of clamp 8, wherein the second gear train remains idle when the first gear train is operating.

10. An electronic transmission range select actuator for setting a transmission range of a vehicle, the electronic transmission range select actuator comprising
   an output shaft configured to be connected to a transmission of the vehicle;
   a first gear train that connects a first actuator to the output shaft and transmits rotational output of the first actuator to the output shaft, the first gear train including a carrier that is fixed to the output shaft;
   a second gear train that connects a second actuator to the output shaft and transmits rotational output of the second actuator to the output shaft, the second gear train including a drive ring that surrounds the carrier, wherein
      in some operating conditions of the transmission system, the output shaft is driven by the first actuator to rotate over a limited rotational range via the first gear train and the drive ring is configured to provide lost motion relative to the carrier over the limited rotational range, and
      in other operating conditions of the transmission system, the output shaft is driven by the second actuator via the second gear train and the drive ring is configured to engage the carrier to adjust an angular orientation of the output shaft.

11. The electronic transmission range select actuator of claim 10, wherein the electronic transmission range select actuator is configured so that during the some operating conditions of the electronic transmission range select actuator, the output shaft is driven by the first gear train and the second gear train is inactive, and during the other operating conditions of the electronic transmission range select actuator, the output shaft is driven solely by the second gear train.

12. The electronic transmission range select actuator of claim 10, wherein the carrier comprises
   a hub that is supported on the output shaft, and
   a dog tooth that protrudes radially outwardly from the hub.

13. The electronic transmission range select actuator of claim 12, wherein the drive ring comprises a pair of diametrically opposed drive teeth that protrude inward from an inner surface of the drive ring, and the drive ring is supported on the hub via the drive teeth.

14. The electronic transmission range select actuator of claim 10, wherein
   the carrier comprises a hub that is supported on the output shaft, and a pair of equidistantly-spaced dog teeth that protrude radially outwardly from the hub,
   the drive ring comprises a pair of diametrically opposed drive teeth that protrude inward from inner surface of the drive ring,
   during the some operating conditions of the electronic transmission range select actuator, the output shaft is driven by the first gear train whereby the carrier rotates relative to the drive ring within the limited rotational range and does not engage the drive teeth, and
   during the other operating conditions of the electronic transmission range select actuator, the output shaft is driven by the second gear train via engagement of the drive teeth with the dog teeth.

15. The electronic transmission range select actuator of claim 10, wherein
   a drive shaft of the first actuator is parallel to the output shaft,
   the first gear train comprises, an idler shaft, and
   gears mounted on the idler shaft transmit rotation from a gear on the drive shaft of the first actuator to a gear on the output shaft such that the rate of rotation of the output shaft is less than the rate of rotation of the drive shaft of the first actuator.

16. The electronic transmission range select actuator of claim 10, wherein
   a drive shaft of the second actuator is perpendicular to the output shaft and supports a worm gear, and
   the second gear train includes
      the worm gear,
      a ring gear having external teeth that engage teeth of the worm gear, and
      the drive ring, where the drive ring is fixed to an inner surface of the ring gear.

17. The electronic transmission range select actuator of claim 10, wherein
   a transmission range is set based on an angle of the output shaft,
   the first gear train is operable to rotate the output shaft between a first angle corresponding to a parking transmission range and at least one other angle, the at least one other angle corresponding to a non-parking transmission range, and
   the second gear train is operable to rotate the output shaft from the at least one other angle to the first angle.

18. The electronic transmission range select actuator of claim 17, wherein the second gear train remains idle when the first gear train is operating.

* * * * *

UNITED STATES PATENT AND TRADEMARK OFFICE
CERTIFICATE OF CORRECTION

PATENT NO. : 10,591,055 B2
APPLICATION NO. : 15/401676
DATED : March 17, 2020
INVENTOR(S) : Raul Nava Gonzalez Page 1 of 1

It is certified that error appears in the above-identified patent and that said Letters Patent is hereby corrected as shown below:

In the Claims

In Claim 7, at Column 8, Line 24, delete the word "chive" and insert the word --drive-- in its place.

In Claim 14, at Column 9, Line 21, insert the word --an-- between the words "from" and "inner".

In Claim 15, at Column 10, Line 3, delete the "," between the words "comprises" and "an".

Signed and Sealed this
Seventh Day of July, 2020

Andrei Iancu
*Director of the United States Patent and Trademark Office*